March 18, 1930. W. J. MILLER 1,751,049
AUTOMATIC MEANS FOR TURNING AND FINISHING
WARE IN THE MANUFACTURE OF POTTERY
Filed Aug. 26, 1927 6 Sheets-Sheet 1

Fig.1.

INVENTOR.
William J. Miller
BY K. G. Doub
ATTORNEY.

March 18, 1930.   W. J. MILLER   1,751,049
AUTOMATIC MEANS FOR TURNING AND FINISHING
WARE IN THE MANUFACTURE OF POTTERY
Filed Aug. 26, 1927   6 Sheets-Sheet 3

INVENTOR.
William J. Miller
BY
K. G. Doub
ATTORNEY.

March 18, 1930.  W. J. MILLER  1,751,049
AUTOMATIC MEANS FOR TURNING AND FINISHING
WARE IN THE MANUFACTURE OF POTTERY
Filed Aug. 26, 1927  6 Sheets-Sheet 4

INVENTOR.
William J. Miller
BY
*K. G. Doub*
ATTORNEY.

March 18, 1930.  W. J. MILLER  1,751,049
AUTOMATIC MEANS FOR TURNING AND FINISHING
WARE IN THE MANUFACTURE OF POTTERY
Filed Aug. 26, 1927   6 Sheets-Sheet 6

INVENTOR.
William J. Miller
BY
K. G. Doub.
ATTORNEY.

Patented Mar. 18, 1930

1,751,049

UNITED STATES PATENT OFFICE

WILLIAM J. MILLER, OF SWISSVALE, PENNSYLVANIA

AUTOMATIC MEANS FOR TURNING AND FINISHING WARE IN THE MANUFACTURE OF POTTERY

Application filed August 26, 1927. Serial No. 215,615.

This invention relates to an automatic means for turning and finishing ware in the manufacture of pottery.

It is preferred to employ the present invention in conjunction with the structure disclosed by my copending application Serial No. 203,186, filed July 2, 1927, means for transferring ware in the manufacture of pottery, and the drawings illustrate such cooperative relationship, means being thus provided for the full automatic operation of picking up the ware and turning and finishing it and then replacing the ware at its point of pick-up or transferring the ware to some other desired point of deposit. However, it should be understood that the invention may be used in conjunction with any structure to which it may be applicable, or the ware fed to and removed therefrom manually, the invention not being limited in this respect.

An essential object of the invention, therefore, is to automatically turn and finish the surfaces of pottery ware, both exterior and interior, and thus render same uniform and, if desired at the same time reduce the thickness of the ware and also form various designs and indentations or projections on the surfaces of ware made in block molds and which would otherwise require the ware to be formed in sectional molds, and further, to remove the fin left by the mold, whether sectional or block molds, and swab, dampen, smooth, burnish, polish and otherwise enhance the appearance of the ware, and also to complete and render symmetrical designs or irregularities that may already be present on the ware.

With the foregoing and other objects and advantageous features in view and which will become apparent upon a consideration of the specification in connection with the drawings, the invention consists in the preferred construction and arrangement of parts which will be more fully hereinafter described and claimed.

In the drawings:

Fig. 1ª is a detail view of preferred forms of cams embodied in Fig. 1;

Fig. 2ª is an enlarged detail view of a preferred form of tool and cooperating parts as embodied in Fig. 2;

Fig. 4ª is a horizontal section taken on the line 4ª—4ª, Fig. 4;

Figure 1:
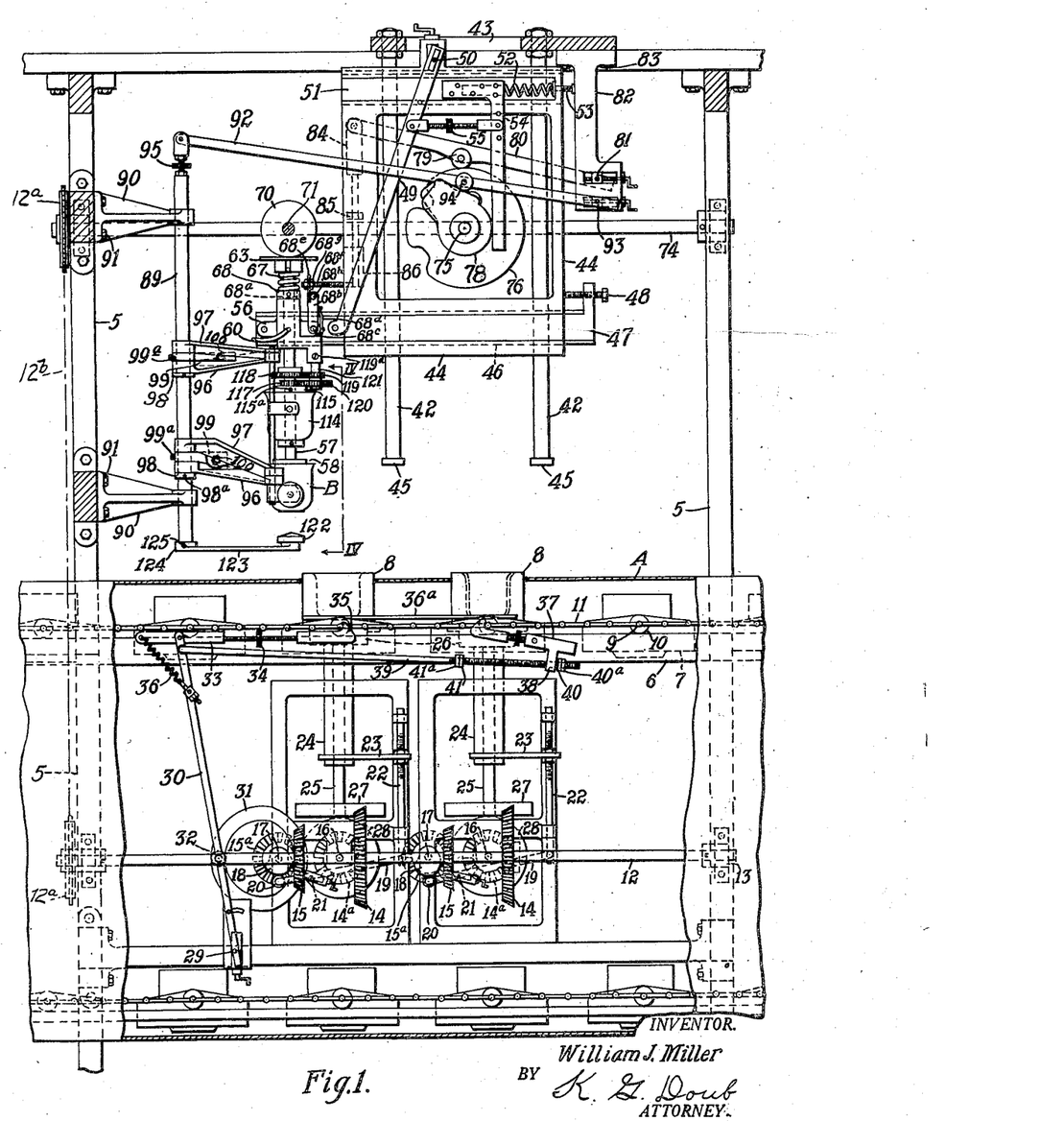
Figure 1 is a view in section and side elevation of a structure embodying part of the features of the invention taken on the line 1—1, Fig. 3.
Figure 1A:
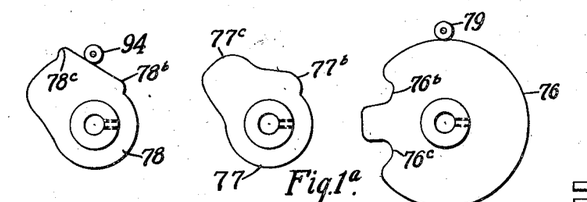
Figures 2, 2A, 4:
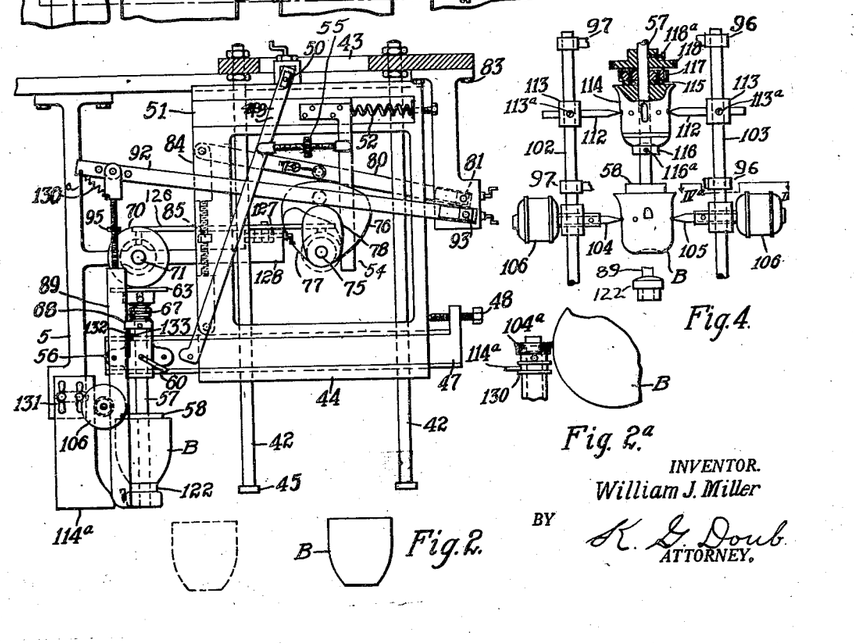
Fig. 2 is a view similar to Fig. 1 taken on the line 2—2, Fig. 3, the lower portion of the structure being omitted.
Fig. 4 is a view taken on the line 4—4, Fig. 1.
Figure 3:
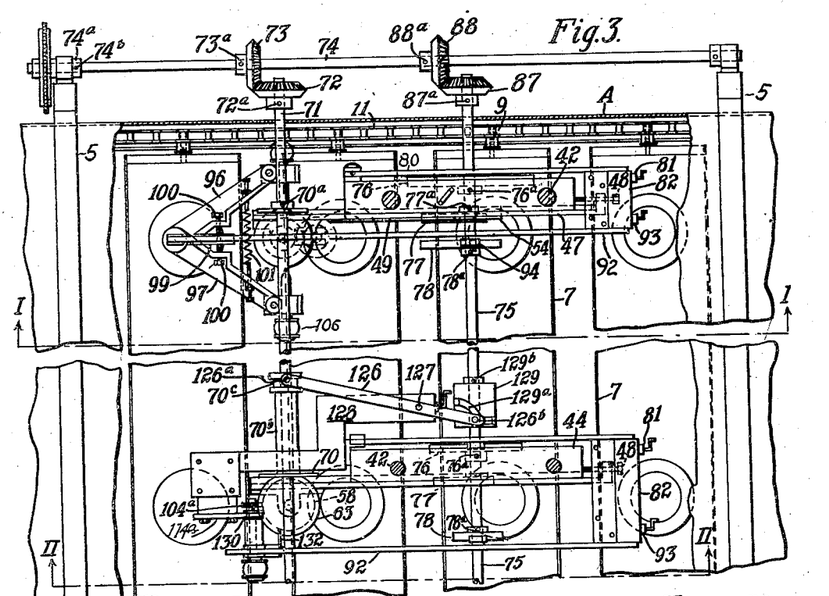
Fig. 3 is a sectional plan view of the structures shown by Figs. 1 and 2.
Figure 4A:
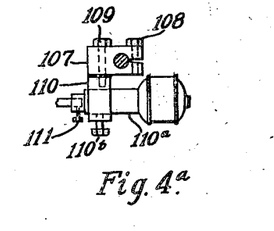

To illustrate one application of the invention, in Figs. 1, 2 and 3 the ware, preferably in a leather-hard condition, is shown as being removed from molds moving through a drying chamber and turned and finished and then replaced in the same or other molds or forms in the drying chamber, in order that the drying process may be completed. The means for conveying the ware and molds through the drier and, likewise, the means for removing the ware from the molds and moving same into operative adjacency to the turning and finishing tools and redepositing the turned and finished ware in the molds in the drier or at other points may be readily understood by referring to my copending application Serial No. 203,186, above noted, and also my copending application Serial No. 202,629, filed June 30, 1927, conveying mechanism, and a brief description thereof should suffice.

The numeral 5 generally designates a stationary frame, having tracks or rails 6 adjustably secured thereto or supported thereby, on which trays or pallets 7 provided with openings or seats for carrying molds 8 have movement, said trays having projecting trunnions 9, which are provided with bearing rollers 10, for supporting the trays while on said tracks, these projecting trunnions also extending through or being connected to the links of a conveyor chain 11, the trays 7 being thereby connected in series in said chain. Extending horizontally along the lower portion of the frame 5 is a main drive shaft 12, rotatably mounted in suitable bearings 13, said shaft being provided with suitable gearing along its length for operating the various fabricating units that may be driven thereby. That portion of the shaft herein shown is provided with siutable bevel gears 14 and 15, meshing with corresponding gears 14ª and 15ª, secured on shafts 16 and 17, extending at right angles to said drive shaft 12, the shafts 17 having adjustably secured thereon cams 18, adapted to impart movement to levers 19, provided with cam rollers 20, said levers being adjustably fulcrumed at 21, the point of fulcrum being adjustable while in operation and while the driving connection subsists preferably through the medium of the sliding block adjustment as shown and described in my copending application Serial No. 203,186, above noted. The levers 19 are pivoted at one extremity to pitmen 22, extending vertically and adjustably connected by cross forks 23 to hollow jigger spindles 24, which are telescoped over and in spline-sliding engagement with spindles 25, the spindles 24 terminating in chucks 26, adapted to support and center or definitely position the molds 8 during jiggering or other operations. Coacting friction gears 27 and 28 are adjustably secured on the spindles 25 and shafts 16 respectively, for imparting rotation to the molds if desired or necessary for a fabricating operation, and through the cams 18, levers 19 and pitmen 22, the chucks and molds may be positioned and reciprocated or raised and lowered if found desirable.

Adjustably pivoted to the lower portion of the frame 5, as at 29, through the medium of the sliding block adjustment above referred to, is a lever 30, adapted to be actuated by a cam 31, which is adjustably secured on shaft 17, acting on a cam roller 32 mounted on said lever 30, the upper extremity of the lever 30 being provided with a pivotally mounted, adjustable-length pawl 33, adjustment being effected through the medium of a turnbuckle 34, said pawl having a hook end 35, adapted to catch over the projecting trunnions 9 of the trays 7 during the forward movement of the lever 30 and slide under said trunnions during the return stroke of said lever, a spring 36, adjustably secured at one extremity to the lever 30 and at its opposite extremity to the pawl 33, serving to prevent the hook end 35 of said pawl from lowering by gravity out of contact with said trunnions, and a guard rail 36ª, mounted on the frame 5, preventing excess elevation of said hook 35. To lock the trays in stable position while a fabricating or other operation is being performed relatively to the molds 8, an adjustable-length latch 37 is pivotally mounted on the tracks 6, said latch being formed with a lug 38, a rod 39 having a limited sliding movement through this lug, said rod being pivotally secured at one extremity to the lever 30 and at its opposite extremity threaded to receive abutment nuts 40 and 41 and lock nuts 40ª and 41ª. The nut 40 may be adjusted on rod 39 so that when the lever 30 approximately completes its forward stroke, said nut will contact with lug 38 and cause the latch to catch over the projecting trunnion 9 of the tray and maintain the latter in stable position while the lever 30 is moving back on its return stroke, the nut 41 being adjusted on rod 39 so that it will contact with lug 38 at approximately the completion of the return stroke of lever 30 and trip or release the latch 37 from the said trunnion and permit another forward shift of the trays. The throw of lever 30 may be varied while in operation by shifting the pivotal point 29. It will be understood that this tray-shifting structure is mounted to act on both sides of the trays or on each side of the conveying mechanism.

In Fig. 1 the mold-conveying and reciprocating and rotating mechanism is shown extending through a drier, generally indicated at A, the drier being provided with suitable sized openings at the points of removal of the ware to be turned and finished and replacement of the ware after the turning and finishing or other operation has been completed.

By referring to the upper portion of Fig. 1, it will be noted that guide posts 42 are shown as depending from and adjustably secured to a platform or cross brace structure 43, which in turn is adjustably secured to the frame 5, said guide posts being adapted to guide and support a supplemental frame 44, which is vertically slidable on said posts, the lower ends of the latter being formed with stop heads 45, which in some instances support the frame 44 when in its lowermost position and act as a stop for said frame. The lower part of the frame 44 is formed with a dove-tailed groove, indicated in dotted lines at 46, a bar 47 being mounted to slide horizontally in said groove, said bar being formed with a screw bracket at one extremity for insertion of an adjusting screw 48. A lever 49 is pivoted at its lower extremity to the bar 47, and at its upper extremity adjustably pivoted, through the medium of the sliding block adjustment heretofore specified, as at 50, to the frame 44. The upper portion of the frame 44 is formed with a further dove-tailed groove, also indicated in dotted lines in Fig. 1, for slidably supporting a bar 51 in a horizontal plane, said bar terminating at the right as viewed in Fig. 1 a suitable distance from the end of the groove, thus providing a recess for insertion of a suitable compression spring 52, adjustable through the medium of a screw 53, the bar 51 being adjustably maintained under longitudinal pressure by said screw and spring. A suitable cam-contacting member or bracket 54 is secured to the bar 51, and to connect the bracket 54 and lever 49 in readily adjustable association, a turn-buckle 55 is pivotally secured to said bracket and lever, a plurality of securing holes being provided in the bracket 54 and lever 49, so that the turn-buckle may be adjustably mounted thereon and adjusted at various elevations to adjust the throw of the lever 49.

Figure 16:
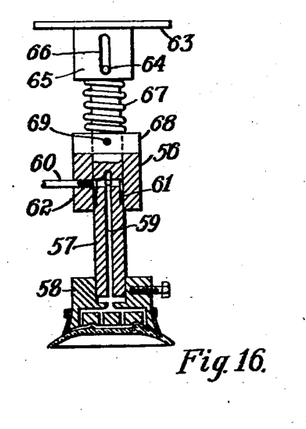
Fig. 16 is an enlarged detail view in section and side elevation of an assembly.

The lower lateral sliding bar 47 has secured thereto a supporting member or bracket 56, adapted to support a ware pick-up and transfer and manipulating assembly, preferably comprising in the form shown by Fig. 1 a rotatably mounted, vertically disposed shaft 57, shown in detail in Fig. 16, having removably and adjustably secured to the lower end thereof a head or chuck 58, which may be of any form adapted for the ware being operated upon and as shown and described in my copending application Serial No. 203,186, hereinbefore noted, said shaft being formed with a longitudinal bore 59, communicating at its lower terminus with the chambered body of said head 58 and at its upper extremity with a suitable flexible member or tube 60, which leads to a control valve, not shown, for admitting a fluid medium or super and/or subatmosphere to the head or chuck or gripping member 58 preferably in a manner shown and described in my copending application just specified, the shaft 57 preferably being formed with an annular recess, as at 61, where it extends through the bracket 56, a threaded nipple 62 being inserted in the said bracket and communicating with said recess, so that the desired fluid medium may be admitted to the ware grip-head or chuck 58 through the bore of the shaft during rotative or reciprocatory movement of the latter. A friction gear or disk 63 is resiliently mounted on the upper extremity of the shaft 57, and to provide for such resilient mounting, I prefer to form a transverse bore in the shaft for insertion of a pin 64, the hub 65 of the said gear being slotted, as at 66, and the pin 64 extending through this slot, a spring 67 being interposed between the friction gear 63 and a bearing collar 68, removably and adjustably secured on the shaft 57 as by screw 69, said collar having bearing on the bracket 56. The friction gear 63 is adapted to coact with a similar gear 70, adjustably secured on a shaft 71 as by a screw 70ª extending through the hub of said gear, (see Fig. 3). The shaft 71 may be driven continuously through the medium of suitable bevel or mitre gears 72 and 73, respectively secured on the shaft 71 and an upper drive shaft 74 and adjustably mounted as by screws 72ª and 73ª extending through the hubs of said gears. The ware pick-up and transfer and manipulating assembly comprises other instrumentalities which will be hereinafter described. Shaft 74 is adjustably mounted as by collars 74ª and screws 74ᵇ.

One preferred method of imparting vertical movement to the frame 44 and lateral movement to the bars 47 and 51, to thereby impart the desired movements to the ware pick-up and transfer and manipulating assembly above specified, is to mount a cam shaft 75 in suitable bearings on the main stationary frame 5, said shaft having secured thereon cams 76, 77 and 78, adjustably secured as by screws 76ª, 77ª and 78ª extending through the hubs of said cams, the cam 76 being adapted to impart vertical movement to the frame 44, the cam 77 contacting with the bracket 54 to impart lateral movement to the bars 47 and 51, and the cam 78 imparting vertical movement to the ware turning and finishing tools when such movement is desired and found necessary and which will be hereinafter described. The cam 76 is adapted to contact with a roller 79 on a lever 80, adjustably pivoted at one extremity through the medium of the sliding block adjustment heretofore specified, as at 81, to a bracket 82, which is secured to the platform or brace structure 43 as at 83, and said lever at its opposite extremity is hingedly or pivotally connected to the frame 44 through the medium of a terminal bracket 84, threaded on one extremity of a turn-buckle 85, the opposite extremity of the latter being threaded through a lug or ear 86, which may be formed integral with the frame 44, the turn-buckle 85 providing for adjustment, while in operation and without disconnecting the driving connection, of the reciprocation of the frame 44. The cam shaft 75 is here shown as being driven through the medium of suitable bevel or mitre gears 87 and 88, respectively secured on the shafts 75 and 74 and adjustably mounted as by inserting screws 87ª and 88ª through the hubs of said gears into contact with said shafts.

By referring to my copending application Serial No. 203,186, heretofore specified, the operation of the ware pick-up and transfer means will be readily understood as well as the means for selectively spotting the grip head and ware and causing the latter to move in a predetermined path between predetermined points and the various advantageous adjustments incident thereto.

The cams 76, 77 and 78 may have any desired surface contour in accordance with the movements to be imparted to the parts primarily actuated thereby. In the structure illustrated by Figs. 1, 2 and 3, the cam 76, (see Fig. 1ª), for imparting vertical movement to the ware pick-up, transfer and manipulating assembly, may be formed with depressions 76ᵇ and 76ᶜ, the cam 77 with a raised part 77ᵇ and a high part 77ᶜ, and the cam 78 with a raised part 78ᵇ and a high part 78ᶜ.

The ware turning and finishing instrumentalities which embody the features of the present invention are illustrated herein in a number of different forms but the general principle of the invention is the same, and it will be understood that obvious variations and adaptations may be made without departing from the scope of the invention as claimed.

Referring to Fig. 1, the numeral 89 designates a supporting member or bar or shaft, vertically disposed in the present instance and slidable vertically in brackets 90, suitably secured to the main stationary frame 5 as at 91. A lever 92 is adjustably pivoted at one extremity, as at 93, to the stationary bracket 82 through the medium of the sliding block adjustment heretofore specified, a cam roller 94 being rotatably mounted on said lever and contacting with cam 78, and at its opposite extremity this lever is pivotally and adjustably connected to the upper end of the shaft 89 as by turn-buckle 95. Brackets 96 and 97 are mounted on the shaft 89 and adapted to have turning movement on said shaft in a horizontal plane, the brackets 96 being supported by bearing collars 98, secured and adjustable on shaft 89 as by screws 98ª, and between the brackets 96 and 97 on said shaft 89 I prefer to mount supplemental abutment brackets 99, adjustably secured as by screws 99ª, adjusting screws 100 being threaded through these brackets and abutting against said brackets 99, see Fig. 3, for a purpose to be explained, the brackets 96 and 97 being connected and maintained under lateral tension as by a spring 101, adjustably secured to each of said brackets.

The brackets 96 and 97 serve to support tool-supporting members or bars 102 and 103, particularly shown in Fig. 4, a cutting tool 104 and finishing and burnishing tool 105 being secured on the lower portions of these bars, each tool being preferably independently driven by a motor 106 in the structure illustrated in Fig. 1, the motor and tool as a unit being universally adjustable as shown in Fig. 4ª, a clamp 107 being mounted on each shaft 102 and 103 and adjustably secured as by screw 108, said clamp being bored for insertion therethrough of a further screw 109, threaded at one extremity into a block 110, adapted to support the motor and tool assembly, the motor sleeve 110ª extending through said block and adjustably secured as by screw 110ᵇ. Through the medium of screw 108, the tool assembly may be adjusted vertically on shafts 102 and 103; by screw 109, the angle thereof may be varied or adjusted, and by screw 110ᵇ, the assembly may be adjusted horizontally, each adjustment being independent of the other. Each tool 105 is removable and replaceable on the armature or motor shaft as by screws 111. At a suitable distance above the tools 104 and 105 on bars or rods 102 and 103, pattern-cam contour-following and guiding tools or stylus members 112 are removably and adjustably secured in brackets 113 as by screws 113ª, these tools 112 being adapted to follow any desired contour or pattern which may be formed on a pattern cam 114, removably and adjustably and, if desired, rotatably mounted on the shaft 57 carrying the grip head or chuck 58 through the medium of upper and lower collars 115 and 116, adjustable as by screws 115ª and 116ª, the upper collar being fast to the pattern cam and the lower collar being a bearing collar for said cam in the event it is desired to rotate same on shaft 57.

It may sometimes be desired to rotate the pattern cam 114 independently of or at a different rate of speed relatively to the ware being operated upon, to increase or reduce the size or number of figures produced on the ware relatively to the pattern cam, in which event variable speed gears 117, 118, 119 and 120 may be provided, the gear 117 being suitably secured to and rotatable with the pattern cam 114, see Fig. 4, the gear 118 being removably and adjustably secured to shaft 57 as by screw 118ª, and the gears 119 and 120 being idler gears and rotatably mounted on a counter or stub shaft 121, which is adjustably secured in the bracket 56 as by screw 119ª, said idler gears 119 and 120 preferably being cast integral and having bearing on stub shaft 121. Varying speeds of rotation of the pattern cam 114 may be obtained by substituting proper sized gears, as will be understood. When it is desired to rotate said pattern cam 114, screw 115ª may be retracted from contact with shaft 57, as will be understood.

A bottom turning and finishing tool 122 is removably and adjustably secured on the lower end of shaft 89, said tool having a contour of the size and shape of the bottom of the ware and formed with an arm 123 terminating in a hub 124, adapted to fit over the shaft 89 and adjustably secured as by screw 125.

The screws 100 serve to positively limit the movement of the tools 104, 105 and 112 in a direction towards each other, to facilitate movement of the pattern cam and ware therebetween, and also by this means the depth of cut may be limited regardless of the pattern cam 114, while the opposite direction of movement of said tools is maintained resilient. These screws may be adjusted relatively to the size of the ware being operated upon.

When turning and finishing ware having irregularities thereon such as flutes, ribs, etc., and oval shaped ware, it may be necessary to definitely spot the angular position of the head 58 and pattern cam 114 relatively to the ware in or on the molds, in which event the collar 68 may be formed with a notch 68ª, a latch 68ᵇ being pivotally mounted on bracket 56 as at 68ᶜ and under spring pressure as by spring 68ᵈ and normally pressed into notch 68ª. A hook 68ᵉ is adjustably threaded on a stud bolt 68ᶠ and maintained in adjusted position as by set nuts 68ᵍ, said bolt 68ᶠ in turn being adjustably threaded in frame 44, a hook-engaging pin 68ʰ being suitably secured in the upper extremity of the latch 68ᵇ. When the bar 47 carrying the ware pick-up and manipulating and transfer assembly and pattern cam 114 is shifted to the left as viewed in Fig. 1, hook 68ᵉ may be adjusted on stud bolt 68ᶠ so as to contact with pin 68ʰ approximately at the time disks 63 and 70 engage and move latch 68ᵇ out of notch 68ª thus permitting free rotation of shaft 57, and when said bar 47 is shifted toward the right approximately a distance sufficient to permit disengagement of disks 63 and 70, said hook will permit spring 68ᵈ to press latch 68ᵇ back into registration with notch 68ª and thus prevent further rotation or angular movement of shaft 57 and head 58 and pattern cam 114 secured on said shaft. By adjusting collar 68 through screw 69 and thereby the position of notch 68ª relatively to shaft 57, the angular position of head 68 and cam 114 may be definitely spotted.

When necessary, the molds 8 may also be definitely positioned on the trays 7 and chucks 26 by means such as disclosed in my copending application Serial No. 225,992, filed Oct. 13, 1927.

In the example illustrated by Fig. 1, the ware, indicated by B, has been gripped and raised from the mold 8 which is shown as being adjacent the latch 37, then moved toward the left into operative adjacency to the turning and finishing assembly, and while the turning and finishing operation is being completed, a forward shift will have been imparted to the mold from which the ware was taken, the turned and finished ware then being deposited in the mold, the grip head then moving back toward the right to repeat the operation, all parts being readily adjustable to synchronize these several movements.

In the position as shown in Fig. 1, the ware is in the process of being turned and finished, the cams 76 and 77 which impart vertical and horizontal movements to the ware pickup and transferring and manipulating assembly being at a dwell stage, while the cam raise 78ᵇ of cam 78 is in contact with roller 94 of lever 92 and raising shaft 89 together with the turning and finishing assembly, the friction disks 63 and 70 being in contact and imparting rotation to shaft 57 and pattern cam 114 and grip head 58 which is holding the ware B. As the pattern cam 114 and ware revolve in a horizontal plane, the contour-following and guiding tools 112 will cause the turning and finishing tools 104 and 105 to impart a similar contour and pattern, or either or both on an enlarged or reduced scale, to the ware, and this contour and pattern may be of any shape desired, including embossing and engraving. It is preferred to have the turning or cutting tool work in a plane in advance of the finishing and burnishing tool. When the high part 78ᶜ of cam 78 contacts with roller 94 of lever 92, the tools 104 and 105 will have finished their work and the bottom tool 122 will act on the bottom of the ware, after which the cam roller 94 moves off the high part 78ᶜ of cam 78 and the turning and finishing assembly is slightly lowered, to permit the tool 122 to clear the ware. The cam raise 77ᵇ of cam 77 then contacts with the cam bracket 54 and shifts the bars 47 and 51 together with the ware pick-up, transfer and manipulating assembly to the right directly over the mold 8 from which the ware was previously taken and which has been shifted a step forward, and at this time the cams 18 of the mold conveying and reciprocating mechanism may be adjusted to raise the molds from the trays 7. However, this is optional and the molds need not be raised if so desired, all parts being adjustable to lower the grip head the necessary distance, as explained in my copending application Serial No. 203,186, hereinbefore noted. The roller 79 of lever 80 then moves into cam depression 76$^b$ of cam 76 and the frame and ware pick-up, transfer and manipulating assembly lower, the grip head depositing the finished ware in the mold, the several timed operations of releasing and gripping the ware being described and illustrated in my copending application just specified. The roller 79 of lever 80 then rolls out of depression 76$^b$ and dwells until the high part 77$^a$ of cam 77 shifts the grip head back toward the right as viewed in Fig. 1 to grip another piece of ware to be turned and finished in the manner just explained, the cam depression 76$^c$ causing the grip head to lower to grip the ware in the mold, which is preferably raised at this time, after which roller 79 of lever 80 moves out of depression 76$^c$, raising the grip head, said roller 79 then contacting with dwell surface of cam 76 while the high part 77$^c$ of cam 77 moves out of contact with the cam bracket 54 secured to bar 51 which moves against the resistance of spring 52 and the ware is again moved into operative adjacency to the turning and finishing tools, cam raise 78$^b$ then contacting with roller 94 of lever 92 and the turning and finishing operation repeated.

Shaft 74 may be independently driven, or the drive may be primarily from shaft 12 and shafts 74 and 12 connected and synchronized through sprockets 12$^a$ and flexible connecting member 12$^b$.

It will be noted that the throw of lever 92 may be varied while in operation or while the driving connection subsists by shifting the pivot point 93, to thereby vary the vertical reciprocation or movement imparted to bar 89, and by adjusting turnbuckle 95, the altitude of vertical reciprocation or movement of said bar may be varied while in operation without varying the extent of reciprocation, and furthermore, all working parts including cams 76, 77 and 78 are adjustable with a view to readily timing and synchronizing the operation of the improved automatic ware turning and finishing structure. These adjustment features may be more readily understood by referring to my copending application Serial No. 203,186, hereinbefore noted.

The turning and finishing tools may be of any suitable character adapted for this class of work and of any desired shape best adapted for the particular pattern or configuration to be cut or embossed on the ware, and by using gears 117, 118, 119 and 120, the pattern cam may be rotated at different speeds relatively to the ware being operated upon and thus produce a multiple of designs around the ware from one design on the pattern cam, or produce one design on the ware from a series of designs on the pattern cam. By obvious modifications in structure, not shown, additional cutting and finishing and contour-following tools may be added, and by using a multiple of cutting and burnishing tools, the operation may be expedited. It may also be desirable to employ one or more tools as roughing tools and others as finishing tools, to cut in sharp or intricate designs.

In Fig. 2 ware may be turned while rotating in one direction and burnished by imparting a reverse rotation thereto, the same tool being used to perform both operations. In this instance the friction drive disk 70 is formed with a sleeve 70$^b$, see Fig. 3, formed at one extremity with an annular groove 70$^c$, the said sleeve being in longitudinal spline-sliding engagement with the shaft 71. A lever 126 is fulcrumed at 127 to an extension bracket 128 of the frame 5, the point of fulcrum being shiftable while in operation through the medium of the sliding block adjustment heretofore specified, the one extremity of said lever 126 being provided with a clutch pin or fork 126$^a$, adapted to ride in groove 70$^c$, and the opposite extremity thereof provided with a pin 126$^b$, adapted to ride in the groove 129$^a$ of a drum cam 129, secured on shaft 75 and adjustably mounted as by screw 129$^b$ extending through the hub of said cam.

The turning and finishing and burnishing tool 104$^a$, see Fig. 3, is guided by a roller 130, which is rotatably mounted on a sleeve on the motor shaft or in any other suitable manner, said roller following the contour of a pattern or profile member 114$^a$, adjustably secured as at 131 to the main stationary frame 5, a spring 130$^a$, secured at opposite ends to lever 92 and shaft 89 respectively, serving to maintain the roller 130 against the pattern 114$^a$. The tool 104$^a$ may be shaped substantially as shown in Fig. 2$^a$, in which instance the ware, to secure the best results, should be rotated counterclockwise to turn the same and clockwise to burnish.

An edge finishing tool 132 is adjustably secured to the shaft or bar 89 as at 133, so that it will contact with and finish the edge of the ware approximately at the time the tool 104$^a$ has operated on the lower outer surface portion of the ware.

In operation, the ware may be turned while the tool 104$^a$ is being lowered or raised, depending upon adjusted position of cam 78, drum cam 129 being timed to shift the disk 70 across center of disk 63 approximately at the completion of the turning operation, to thereby reverse direction of rotation of the ware and burnish same by tool 104$^a$. The tool 104$^a$ may be driven or rotated as by motor 106, in which event said tool may be provided with teeth or other cutting means, or this tool may be maintained non-rotating and the ware only rotated, in which event the cutting edge of said tool may be smooth or have a shape substantially similar to a chisel or analogous cutting tool.

Figure 5:
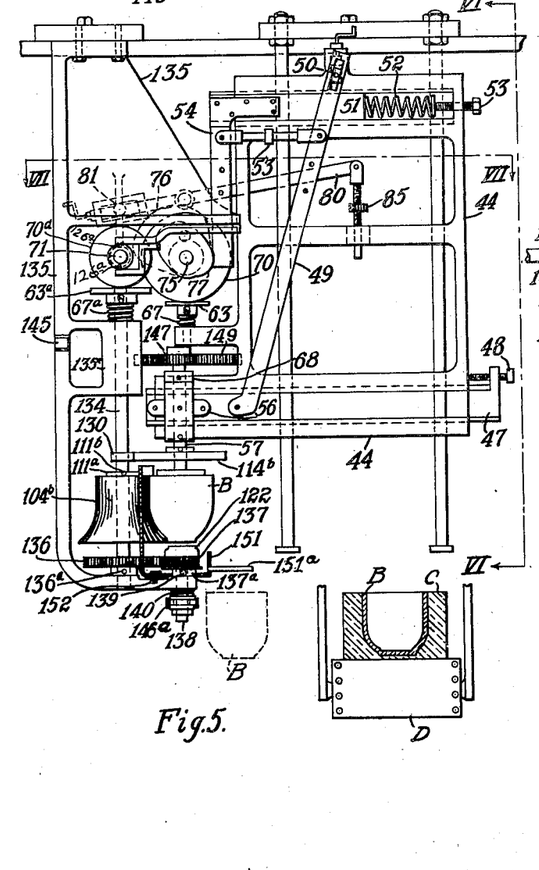
Fig. 5 is a view in side elevation of a modification in structure.
Figure 6:
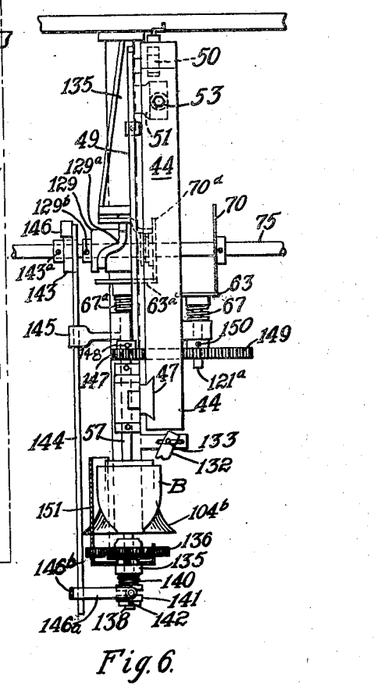
Fig. 6 is a fragmentary view in section and end elevation taken on the line 6—6, Fig. 5.
Figure 7:
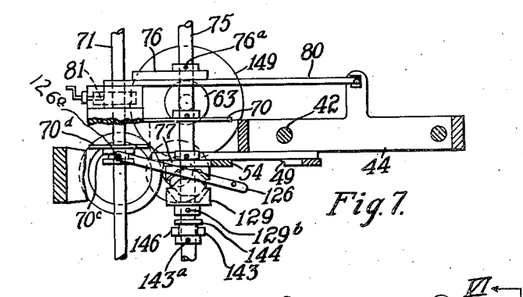
Fig. 7 is a broken, horizontal sectional plan view taken on the line 7—7, Fig. 5.
Figure 8:
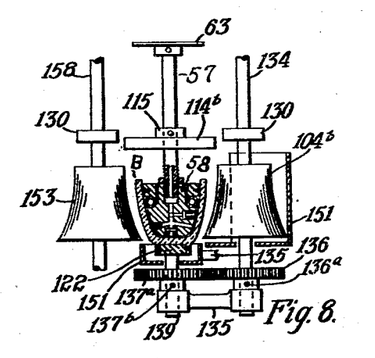
Figs. 8 and 9 are fragmentary views in elevation and transverse vertical section and top plan of a modification in structure, Fig. 8 being taken on the line 8—8, Fig. 9, with the upper portion of the structure omitted.
Figure 9:
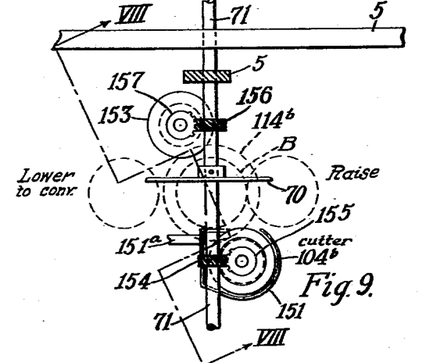

Figs. 5, 6 and 7 illustrate a construction that may be adopted when it is desired to dispense with independent driving means for the turning and finishing tools and also illustrates a form of the latter particularly adapted for oval or eccentrically shaped ware. In this instance the turning and finishing tool 104$^b$ may be reversed for the burnishing operation, said tool being removably and adjustably mounted on a shaft 134 as by collar 111$^a$ and screw 111$^b$, guide roller 130 being rotatably mounted on this shaft and adapted to follow the surface contour of a pattern cam 114$^b$, which may have various surface contours, as for instance, flutes may be formed therein, which would result in a similar outer surface contour of the finished ware. The shaft 134 has bearing in a bracket 135$^a$, forming part of or suitably secured to a supporting bracket 135, the upper extremity of said shaft being provided with a friction disk or gear 63$^a$, resiliently mounted as by spring 67$^a$ in a manner similar to the mounting of disk 63 described in connection with Fig. 1, said disk or gear 63$^a$ being adapted to coact with a similar disk or gear 70$^d$, in longitudinal spline-sliding engagement with shaft 71 and provided with a collar or sleeve formed with a groove 70$^c$ as in the structure shown by Figs. 2 and 3. The lever 126 in this instance, which is actuated by drum cam 129, serves to shift this disk 70$^d$ across the axis of disk 63$^a$ and reverse direction of rotation of turning and finishing tool 104$^b$ instead of the ware as in Fig. 2.

The lower extremity of shaft 134 is provided with a gear 136, removably and adjustably secured as by screw 136$^a$ passing through the hub of said gear, this gear 136 meshing with a hollow pinion gear 137, having a slotted hub 137$^a$, the bottom burnisher in this instance being formed with a stub shaft 138, extending through the gear 137 and slotted hub 137$^a$ and provided with a transverse pin 139 extending through the slot of the hub in a manner similar to pin 64 in Fig. 1 and shown in detail in Fig. 16, to enable the stub shaft 138 to have a limited vertical sliding movement through the hollow pinion 137. The stub shaft 138 extends through the supporting bracket 135, a spring 140 then being inserted thereover and a grooved collar 141 removably secured on the shaft as by screw 142. The bottom burnisher assembly therefore comprises burnisher 122, stub shaft 138, hollow pinion 137 with slotted hub 137$^a$, pin 139 in shaft 138, spring 140 and grooved collar 141, this construction preferably being adopted to permit the bottom finishing and burnishing tool to be moved into contact with the ware independent of tool 104$^b$, which in this instance is preferably maintained in one plane and not vertically reciprocated during the turning and finishing operation. To impart intermittent vertical movement to the bottom burnisher, a cam 143 is mounted on shaft 75 and adjustably secured as by screw 143$^a$, a bar or similar member 144 extending through a guide bracket 145, which may be an extension of bracket 135, being provided to transmit motion from cam 143 to the bottom burnisher, said bar having a roller 146 rotatably mounted on one extremity and adapted to contact with said cam and at its opposite extremity the bar 144 is provided with a yoke or fork 146$^a$, adjustably secured as by screw 146$^b$, adapted to ride in the groove of collar 141.

The shaft 57 in this instance has a pinion gear 147 removably and adjustably keyed on the upper extremity thereof as at 148, said pinion 147 being adapted to mesh with a gear 149, removably and adjustably secured on stub shaft 121$^a$ as by screw 150, pinion 147 and gear 149 being of such size as will impart the necessary speed of rotation to the ware operated upon.

A guard or housing 151 is provided around the ware and ware turning and finishing and burnishing tools, to catch cuttings and chips from the ware during operations thereon, said guard being suitably secured to the main supporting bracket 135 as at 152. A vacuum hose or other member 151$^a$ is attached to this housing or guard, to convey these particles away to a suitable point and, among other functions, this cutting and chip-removing structure serves to prevent clogging of the gears. This housing or guard may be applied to any of the forms when desired and found expedient.

In the structure illustrated by Figs. 5, 6 and 7, the cam 78 may be dispensed with, it not being necessary to impart vertical movement to the tool 104$^b$. In this instance the ware is shown as being removed from the molds and turned and finished and then deposited in a form C on a conveyor D and this transferring operation may be readily understood by referring to my copending application Serial No. 203,186, previously referred to, the movements primarily imparted to the ware pick-up, transfer and manipulating assembly by cams 76 and 77 being substantially the same as described in connection with Figs. 1, 2 and 3. The tool 104$^b$ and bottom burnisher 122 may be continuously driven primarily from shaft 71 through friction gears 70$^d$ and 63$^a$, and it is preferred to impart a greater speed of rotation to tool 104$^b$ than that imparted to the ware through shaft 75, friction gears 70 and 63 and gear 149 and pinion 147. As the ware is moved into operative adjacency to tool 104$^b$ and over bottom burnishing tool 122 and its assembly, the friction gears 63 and 70 engage and the ware is rotated at the desired speed until turned, drum cam 129 being so timed on shaft 71 as to at approximately this time slide friction gear 70$^d$ across the axis of coacting gear 63$^a$ and reverse the direction of rotation of tool 104$^b$ to burnish the ware. Cam 143 may be timed on shaft 75 so as to raise the bottom tool 122 at any time during the turning and finishing operation, and the edge finishing tool 132 may be adjustably secured to the bracket 135 as at 133 and operate in a manner substantially similar to tool 104$^b$.

Figure 10:
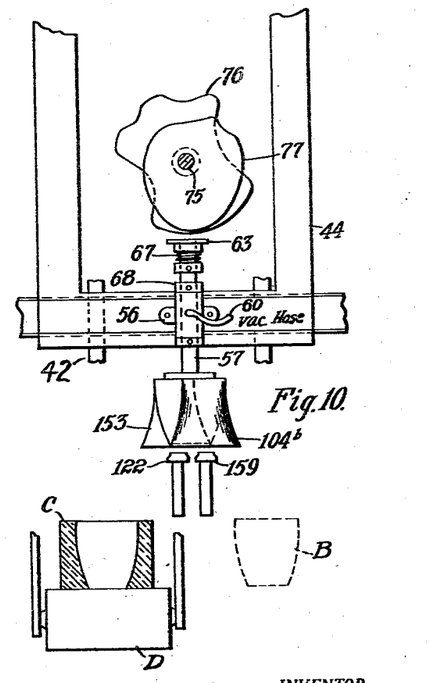
Fig. 10 is a fragmentary view in side elevation illustrating a further modification in structure.

Figs. 8, 9, 10 and 11 illustrate modified forms of turning and finishing and burnishing tools and cooperating parts. In this instance a separate burnisher 153 is provided instead of reversing the direction of rotation of the ware and/or cutter to burnish as in Figs. 5, 6 and 7. The turning tool 104$^b$ is driven from shaft 71 through the medium of a worm gear 154, secured on shaft 71, meshing with a pinion 155, adjustably secured on the upper extremity of shaft 134, and the burnishing tool 153 may also be driven in a similar manner as by worm gear 156 and pinion 157, the latter being secured on the upper extremity of burnisher shaft 158. The ware may be rotated as in Figs. 1 and 2, the drive being direct through friction gears 63 and 70. The bottom burnishing tool 122 is non-reciprocable in the form shown by Fig. 8 and a gear 137$^a$ removably and adjustably secured on stub shaft 139 as by screw 137$^b$. In Fig. 10 a bottom cutting tool 159 is provided in addition to the burnishing tool 122.

Figure 11:
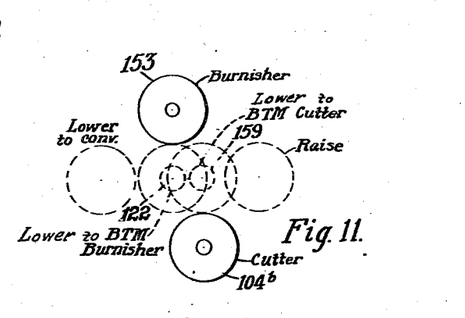
Fig. 11 is a diagrammatic plan view to illustrate the operation of the structure shown by Fig. 10.

By adopting the construction illustrated in Figs. 8, 9, 10 and 11 the ware may be turned and finished while moving in one direction during the operation of transferring the ware from the molds to the forms on the conveyor D. By slightly modifying cams 76 and 77 relatively to similar cams shown in Figs. 1, 2 and 5, the ware may be gripped and raised from the mold, then moved to left as illustrated in Fig. 11, then lowered to turning tools 104$^b$ and bottom tool 159, if such tool is used, then raised and moved slightly to left and lowered to burnish by tools 153 and 122,—this second movement to the left not being of such distance as will move friction gear 63 out of contact with gear 70,—and then slightly raised and moved further to the left and lowered to form C on the conveyor D, and finally raised and moved toward the right back to the next succeeding mold to repeat the foregoing operation.

Figs. 12, 13, 14 and 15 illustrate a structure adapted for shallow ware, such as plates, saucers, etc., or ware requiring swabbing and edge finishing only. In this instance the turning and finishing assembly is adjustably mounted on a post 160, adjustably secured to the platform or cross brace structure 43 as by bolts 161 extending through enlarged openings 161$^a$, said assembly preferably being supported by a bracket 162, see Figs. 13 and 14, clamped on said post 160 and adjustably secured as by bolts 163, collars 164 serving to maintain the bracket in vertical placement and adjustably secured as by screws 164$^a$, the assembly preferably comprising upper and lower fluid-exuding members or swabs 165 and 166, which are adjustably secured as by bolts 165$^a$ and 166$^a$ extending through enlarged opening 165$^b$ and 166$^b$, said members 165 and 166 being formed with chambers 165$^c$ and 166$^c$ and feed ducts 165$^d$ and 166$^d$, leading to the ware-contacting surfaces 165$^e$ and 166$^e$ of said members and which are preferably in the form of sponges or similar fluid-absorbing material, suitable flexible members or tubes 165$^f$ and 166$^f$ opening into said chambers 165$^c$ and 166$^c$ and leading to a source of fluid supply, such as water. An edge turning and finishing tool 167 is preferably mounted on the bracket 162 between the upper and lower swab members 165 and 166 and adjustably secured as by bolts 167$^a$ extending through slotted openings 167$^b$.

Figure 15:
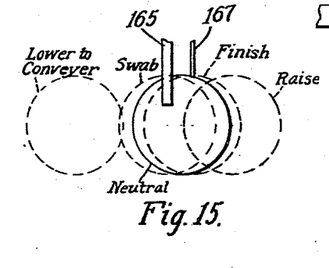
Fig. 15 is a diagrammatic plan view to illustrate the operation of the structure disclosed by Fig. 12.

By referring to the diagrammatic illustration shown by Fig. 15 and the modified shape of cams 76 and 77, the operation of this shallow ware turning and finishing structure should be readily understood, the ware in this instance being first gripped and raised from the mold, then moved to the left into contact with edge turning and finishing tool 167,—friction disks 63 and 70 engaging approximately at this time,—then shifted slightly further to the left out of contact with said tool into a neutral position, then raised into contact with upper swab member 165 and then lowered into contact with lower swab member 166, then slightly raised and moved further to left,—friction disks 63 and 70 disengaging approximately at this time,—and lowered onto conveyor D, the grip head then being raised and moved back to the right to repeat the operation.

Figure 17:
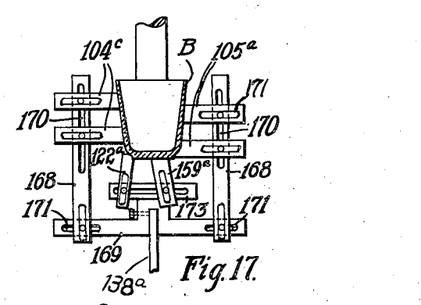
Fig. 17 illustrates in section and side elevation a further modified form of finishing and turning tool.
Figure 18:
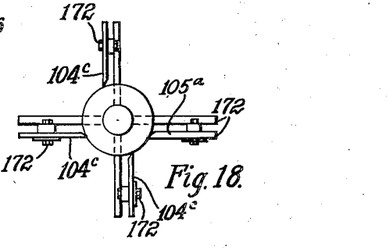
Fig. 18 is a top plan of Fig. 17.

Figs. 17 and 18 illustrate a modified form of turning and finishing and burnishing assembly. In this instance the cutting or turning tools 104$^c$ and burnishing tools 105$^a$ may be adjustably mounted in supporting brackets 168 and 169, as by slots 170 and 171 and securing bolts 172, to provide for both vertical and lateral adjustment, the bottom cutting and burnishing tools 122$^a$ and 159$^a$ being mounted in a similar manner in bracket 173. Bracket 169 may be rotatably mounted on a spindle 138$^a$ and the assembly rotated if desired by suitable driving means or a motor, or the ware only may be rotated, or both ware and assembly rotated in opposite directions.

Figures 19, 20:
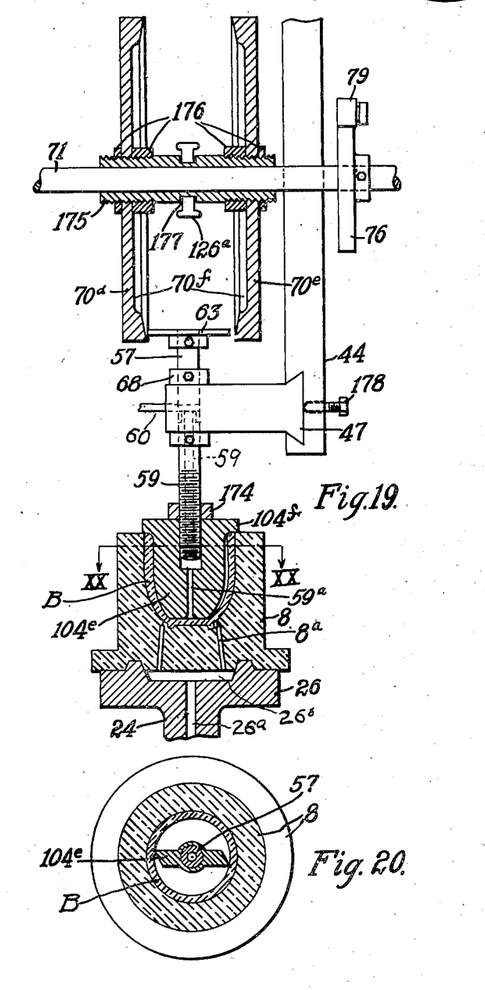
Fig. 19 is a fragmentary sectional end elevation of a preferred structure adapted for turning and finishing the interior of deep ware.
Fig. 20 is a section taken on the line 20—20, Fig. 19.
Figure 21:
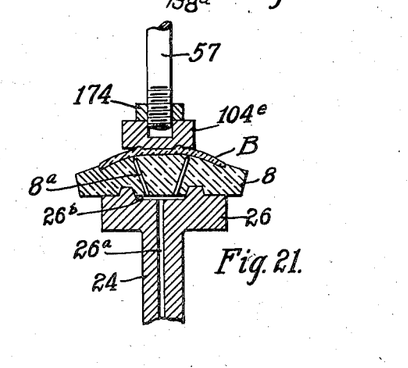
Fig. 21 is a transverse vertical section of a modified form of tool adapted for use with the structure shown by Fig. 19.

In some instances it may be desired to finish the interior of the ware, and in Figs. 19, 20 and 21 I have shown an assembly which may be adopted with this end in view. This interior finishing assembly may be disposed to operate prior or subsequent to the ware finishing structures hereinbefore described, the interior finishing operation preferably ensuing while the ware is in or on the molds, and to maintain the ware in stable position while being operated upon, I prefer to adopt the type of mold and chuck and appurtenant parts as disclosed by my cope, ding application Serial No. 170,613, filed Feb. 24, 1927, method and means for chucking molds in the manufacture of pottery, and wherein the chuck 26 and spindles 24 and 25 are preferably formed with passages 26$^a$, the mold 8 when seated on the chuck forming a chamber 26$^b$, vents 8$^a$ being formed in the mold and communicating at their lower ends with said chamber and terminating at their upper extremities at the top of the mold. Thus when an article of ware is disposed on the mold and a sub-atmospheric condition set up in the chamber 26$^b$ through passages 26$^a$, such condition will be communicated to the underside of the article, and among other functions, serve to maintain same in stable position during any operation that may be performed on said article.

Figure 12:
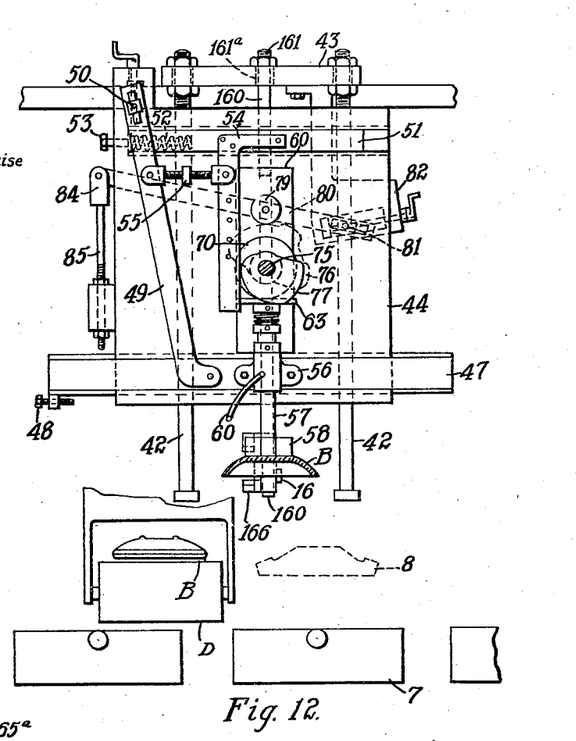
Fig. 12 is a view similar to Fig. 5 of an adaptation of the structure to shallow ware.
Figure 13:
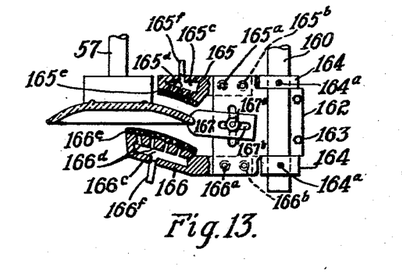
Fig. 13 is an enlarged detail view in section and side elevation of a portion of Fig. 12.
Figure 14:
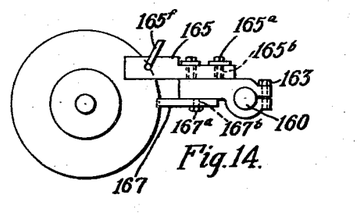
Fig. 14 is a plan view of Fig. 13.

The turning and finishing tools 104$^e$ in the constructions shown by Figs. 19, 20 and 21 may be of different forms, the form particularly illustrated by Fig. 20 being an example of a cutter adapted for deep ware, and that illustrated in Fig. 21 an example of a form of cutter adapted for shallow ware such as plates where it may be desired to turn and finish the bottom of the ware prior or subsequent to being operated upon by the structures shown by Fig. 12.

The shaft 57 in the form shown by Figs. 19 and 20 may be constructed and mounted in a manner substantially as shown in Fig. 16, the bore 59 in this instance communicating at its lower end with a bore 59$^a$ formed in the tool 104$^e$. However, instead of applying sub-atmosphere as a gripping medium to remove or transfer the ware, this construction may be adopted for removing cuttings and particles resulting from the operation of the tool 104$^e$, it not being necessary to remove the ware from the mold to turn and finish the interior thereof. If it should be desired to remove the cuttings and particles in the form shown by Fig. 21, the guard or housing construction illustrated in Fig. 5 may be adopted. The tools 104$^e$ are removably and adjustably threaded on the shaft 57 and maintained in adjusted position as by set nut 174.

Friction disks 63 in this instance coact with driving and reversing disks 70$^d$ and 70$^e$, preferably formed with concaved engaging faces as at 70$^f$, so that when the tool 104$^e$ is lowered into contact with the ware, frictional contact between disks 63 and 70$^d$ will gradually increase as the load or cutting strain on said tool increases, and as said tool is raised from the ware after being reversed to burnish by disk 70$^e$, frictional contact gradually decreases, and this concave construction also serves to prevent drag or scraping of the disks when engaging and disengaging. Disks 70$^d$ and 70$^e$ are preferably adjustably threaded on a sleeve 175, in longitudinal spline-sliding engagement with shaft 71, said disks being maintained in adjusted position on said sleeve as by set nuts 176. At an intermediate point the sleeve 175 is formed with an annular groove 177, in which fork 126$^a$ shown in Fig. 3 is adapted to engage, the drum cam and lever construction preferably being adopted as a means of shifting disks 70$^d$ and 70$^e$ in and out of engagement with disk 63.

The tool 104$^e$ in Fig. 19 is formed with a top flange 104$^f$ for finishing the top edge of the ware, if desired. However, as above stated, these tools may be of any form desired and adapted for the particular type of ware undergoing the turning and finishing operation, and in some instances may be formed of abrasive material or a member having fluted cutting surfaces.

As it is preferred to simply impart vertical movement to the turning and finishing assembly in the form shown by Figs. 19, 20 and 21, it may be desired to maintain the bar 47 against lateral sliding movement, in which event a set screw 178 may be provided in frame 44 and adjustable to bear against said bar. If it should be desired to have a lateral floating action of the turning and finishing assembly, screw 178 may be retracted from engagement with bar 47. Cam 76 in this instance may be shaped to raise and lower the frame 44 and consequently the turning and finishing assembly and dwell when lowered a sufficient length of time to enable the tool 104$^e$ to complete the turning and finishing operation, after which, in the event the interior finishing structure is disposed to operate prior to the hereinbefore described structures, a step movement may be imparted to the mold and the ware gripped and raised into operative adjacency to the exterior finishing tools that may be in operation. If desired the tool 104$^e$ may be maintained in a horizontal plane and the molds raised and lowered to bring the ware into operative adjacency thereto, or both the tool and molds may be reciprocated vertically, as will be understood. Also, the tool may be non-rotating and the mold rotated instead or both rotated in opposite directions or in the same direction but at different speeds.

It will be noted that the turning and finishing tools 104 and 104$^a$ illustrated in Figs. 1 and 2 as well as the swabbing and edge finishing structure illustrated in Fig. 12 could also be adapted for turning and finishing the interior of ware, by obvious modifications in the mounting of these several members and their cooperating parts.

What I claim as new is:

1. In mechanism of the class specified, in combination, a fluid-operated ware pick-up device, means for moving the latter in a predetermined path, of a ware-turning and finishing assembly including rotating cutting and burnishing tools, and a pattern device mounted adjacent said pick-up device for automatically guiding said tools.

2. In mechanism of the class specified, a ware-gripping device, ware turning and burnishing tools adapted to turn the ware during rotation in one direction and burnish the ware during rotation in the opposite direction, means for moving said device within operative adjacency to said tools, and means for imparting intermittent, alternate reverse rotation to either or both said device and tools.

3. In mechanism of the class specified, a ware-gripping device, operable to grip and release ware, ware turning and finishing tools, a pattern cam for guiding said tools, means for moving said device and ware within operative adjacency to said tools, and means for imparting rotation to the grip device and ware and simultaneously moving said tools in a plane at right angles to the direction of rotation.

4. In mechanism of the class specified, a ware-gripping device, operable to grip and release ware, ware turning and finishing tools, means for reciprocating said tools in contact with the ware, and means for selectively adjusting while in operation the extent and area of such reciprocation.

5. In mechanism of the class specified, ware turning and finishing tools, said tools having a resilient mounting in a direction away from the surface being operated upon, and adjustable means for limiting the approach of said tools toward said surface.

6. In mechanism of the class specified, a ware gripping device, and resiliently mounted frictional contact devices for imparting rotation to said device.

7. In mechanism of the class specified, in combination, a ware gripping device, operable to grip and release ware, ware turning tools, a pattern cam mounted adjacent said device and tools and contoured and designed substantially similar to the ware desired to be produced, and means for rotating said cam and ware at the same or varying speeds to produce one or a multiple of designs on the ware.

8. In mechanism of the class specified, a ware gripping device, operable to grip and release ware, a bottom turning and finishing tool, means for rotating said tool, and means for intermittently moving said tool into contact with the bottom of the ware.

9. In mechanism of the class specified, a ware gripping device, operable to grip and release ware, a resiliently mounted bottom turning and finishing tool, and means for simultaneously rotating and reciprocating said tool into contact with the bottom of the ware.

10. In mechanism of the class specified, a ware gripping device, operable to grip and release ware, means for moving said device in a predetermined path between a point of pick-up and a point of deposit, a ware turning and finishing assembly mounted adjacent said path, and means for temporarily halting and rotating said device and ware within operative adjacency to said assembly.

11. In mechanism of the class specified, a ware gripping device, operable to grip and release ware, means for moving said device in a predetermined path between a point of pick-up and a point of deposit, a ware turning and finishing assembly mounted adjacent said path and including swabbing means, and means for temporarily halting and rotating and reciprocating said device and ware within operative adjacency to said assembly.

12. In mechanism of the class specified, a ware turning and finishing assembly comprising cutting and finishing and burnishing tools, means for rotating said tools, a housing adapted to receive the particles of matter resulting from the operation of said tools, and means for removing said particles from said housing.

13. The combination with a ware transferring structure including a ware gripping device, of conveying mechanism for molds containing articles of ware, means for temporarily halting and reciprocating said molds at predetermined points of removal and replacement of the ware in the molds, a ware turning and finishing assembly including cutting and burnishing tools mounted adjacent the ware transferring structure, said ware transferring structure being adjustable to cause said gripping device to grip the ware at the point of removal and move it within operative adjacency to said tools and then release the ware at the point of deposit, and means for rotating said device and ware and rotating and reciprocating said tools.

14. The combination with a ware transferring structure including a ware gripping device, of ware turning and finishing tools mounted in proximity to said device, molds containing articles of ware to be operated upon by said tools, said ware transferring structure including means adjustable to cause said device to grip and remove the ware from the molds preparatory to such operation, and means for definitely spotting the angular position of said device relatively to the ware in said molds.

15. In mechanism of the class specified, a ware finishing tool, means for reciprocating and rotating said tool, and means for reversing the direction of rotation thereof at each reciprocation.

16. In mechanism of the class specified, a ware finishing and burnishing tool adapted for the interior of deep ware, means for reciprocating said tool into operative adjacency to the ware, and means for rotating said tool in one direction to finish the ware and reversing the direction of rotation to burnish the ware.

17. In mechanism of the class specified, a rotatable grip device operable to automatically grip and release ware, rotating turning and finishing tools, and means for guiding said tools including a pattern cam mounted for synchronous rotation relatively to said grip device.

18. In mechanism of the class specified, a rotatable grip device operable to automatically grip and release ware, rotating turning and finishing tools, a pattern cam mounted for synchronous movement relatively to said grip device, and means for rotating said cam and said device in synchronism.

19. In mechanism of the class specified, a rotatable grip device, a pattern cam mounted for synchronous movement relatively to said device, and means for rotating said device and said cam at the same or varying speeds in synchronism.

20. In mechanism of the class specified, a rotatable grip device, a pattern cam mounted adjacent said device, turning and finishing tools, and stylus members mounted to resiliently contact with said cam, said members being connected to said tools to impart relative movements thereto.

21. In mechanism of the class specified, a rotatable grip device, rotating turning and finishing tools, a pattern cam mounted for synchronous movement relatively to said grip device, and means for rotating said cam and said device in synchronism including intermittently contacting friction gears.

22. In mechanism of the class specified, a rotatable grip device operable to automatically grip and release ware, turning and finishing tools, means for guiding said tools comprising a pattern cam mounted for synchronous movement relatively to said grip device and stylus members adapted to follow the design of said cam, and means for automatically moving said device and ware into operative adjacency to said tools.

23. In mechanism of the class specified, a rotatable grip device, a pattern cam mounted for synchronous movement relatively to said grip device, tool-guiding members adapted to follow the contour of said pattern cam, and independently-driven turning and finishing tools connected to said members to have relative movement therewith.

24. In mechanism of the class specified, a rotatably grip device operable to grip and release ware, a pattern cam mounted for synchronous movement relatively to said device, turning and finishing tools adapted to turn and finish the ware in accordance with the contour of the pattern cam, and means for regulating the depth of cut of said tools independently of the design of the pattern cam.

25. In mechanism of the class specified, a rotatable grip device operable to grip and release ware, a pattern cam mounted adjacent said device, tool-guiding members adapted to follow the contour of said cam, and independently-driven turning and finishing tools having a resilient mounting in a plane at substantially right angles to the axis of rotation of said grip device.

26. In mechanism of the class specified, a grip device operable to grip and release ware, means for moving said device in a predetermined path between a point of pick-up and a point of deposit, a ware-turning and finishing assembly mounted adjacent said path, means for temporarily halting and rotating said device and ware within operative adjacency to said assembly, and means for guiding said device and ware.

27. In mechanism of the class specified, a grip device operable to grip and release the ware, means for moving said device in a predetermined path between a point of pick-up and a point of deposit, a ware-turning and finishing assembly mounted adjacent said path, means for temporarily halting and rotating said device and ware within operative adjacency to said assembly, and means for guiding said device, said guiding means being regulable while the device is traversing said path.

28. In mechanism of the class specified, a rotatable grip device operable to grip and release ware, means for moving said device in a predetermined path between a point of pick-up and a point of deposit, a ware-turning and finishing assembly mounted adjacent said path, said assembly including turning and finishing tools and a pattern cam for guiding said tools, and means for temporarily halting and rotating said device and ware within operative adjacency to said assembly.

29. In mechanism of the class specified, a rotatable grip device operable to grip and release ware, means for moving said device in a predetermined path between a point of pick-up and a point of deposit, a ware-turning and finishing assembly mounted adjacent said path; said assembly comprising a pattern cam, independently-driven turning and finishing tools and tool-guiding means adapted to follow the contour of said pattern cam; and means for temporarily halting and rotating said device and ware within operative adjacency to said assembly.

30. In mechanism of the class specified, a fluid-operated rotatable grip device operable to grip and release ware, means for moving said device in a predetermined path between a point of pick-up and a point of deposit, a ware-turning and finishing assembly mounted adjacent said path; said assembly comprising a tool adapted to turn the ware during rotation in one direction and burnish the ware during rotation in the opposite direction; means for temporarily halting and rotating said device and ware within operative adjacency to said assembly, and means for imparting intermittent, alternately-reverse rotation to said tool.

31. In mechanism of the class specified, a rotatable grip device operable to grip and release ware, means for moving said device in a predetermined path between a point of pick-up and a point of deposit, a ware-turning and finishing assembly mounted adjacent said path; said assembly comprising a tool adapted to turn the ware during rotation in one direction and burnish the ware during rotation in the opposite direction and means for guiding said tool; means for temporarily halting and rotating said device and ware within operative adjacency to said assembly, and means for imparting intermittent, alternately-reverse rotation to said tool.

32. In mechanism of the class specified, a rotatable grip device operable to grip and release ware, means for moving said device in a predetermined path between a point of pick-up and a point of deposit, a ware-turning and finishing assembly mounted adjacent said path; said assembly comprising a tool adapted to turn the ware during rotation in one direction and burnish the ware during rotation in the opposite direction and means for guiding said tool; means for temporarily halting and rotating said device and ware within operative adjacency to said assembly, and means for imparting intermittent, alternately-reverse rotation to said tool, said latter means comprising a pair of intermittently contacting, coacting friction gears, one of said gears being continuously driven and adapted to be moved past the axis of rotation of the other of said gears to reverse the rotation of said tool.

33. In mechanism of the class specified, a turning and finishing tool having its working surface formed with teeth adapted to cut material from the ware during rotation in one direction and smooth and burnish the ware during rotation in the opposite direction, and means for imparting intermittent, alternately-reverse rotation to said tool.

34. In mechanism of the class specified, a fluid-operated ware-gripping device, means for moving said device in a predetermined path between a point of pick-up and a point of deposite, and means for temporarily halting and rotating said device while traversing said path, said means including a pair of coacting, intermittently contacting friction gears, one of said gears being continuously driven and mounted adjacent the path traversed by said device.

35. In mechanism of the class specified, a ware-turning and finishing assembly comprising a pair of cutting and burnishing tools spaced a predetermined distance apart, a rotating grip device having a tool-guiding cam mounted in axial alinement relatively thereto, and means for automatically moving said device in a path between said tools.

36. In mechanism of the class specified, a ware-turning and finishing assembly comprising a pair of cutting and burnishing tools spaced a predetermined distance apart, a bottom cutting and burnishing tool, means for rotating said tools; a rotating grip device having a tool-guiding cam mounted adjacent thereto, means for moving said device in a path between said tools, and means for halting and reciprocating and rotating said device in operative adjacency to said tools.

Signed by me this 25th day of August, 1927.

WILLIAM J. MILLER.